United States Patent [19]

Narang

[11] Patent Number: 4,888,257

[45] Date of Patent: Dec. 19, 1989

[54] SOLID ELECTROLYTE

[75] Inventor: Subhash C. Narang, Redwood City, Calif.

[73] Assignee: Fuji Photo Film Co., Ltd., Kanagawa, Japan

[21] Appl. No.: 330,326

[22] Filed: Mar. 28, 1989

[51] Int. Cl.$^4$ ............................................. H01M 6/18
[52] U.S. Cl. ................................................... 429/192
[58] Field of Search ........................ 429/192; 252/62.2

[56] References Cited

U.S. PATENT DOCUMENTS

| | | | |
|---|---|---|---|
| 4,303,748 | 12/1981 | Armand et al. ...................... | 429/192 |
| 4,579,793 | 4/1986 | Armand et al. ...................... | 429/192 |
| 4,798,773 | 2/1989 | Yasukawa et al. .................. | 429/192 |

Primary Examiner—Anthony Skapars
Attorney, Agent, or Firm—Sughrue, Mion, Zinn Macpeak & Seas

[57] ABSTRACT

A solid electrolyte comprising a polymer containing therein at least 50 mol % of a recurring unit represented by general formula (I):

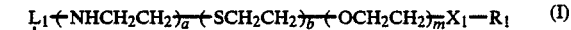
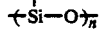
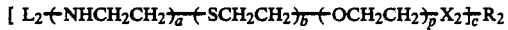

wherein $L_1$ and $L_2$ are each a divalent linking group; $R_1$ and $R_2$ are each hydrogen, an alkyl group, or an aryl group; m and p are each an integer of from 1 to 10; $X_1$ and $X_2$ are each —O— or —S—; n is an integer of from 10 to 100; a and b are each integers of from 0 to 10; and c is 0 or 1, provided that when c is 0, then a or b is at least 1, and a salt of a metal ion belonging to Group I or Group II of the Periodic Table.

11 Claims, 3 Drawing Sheets

SOLID ELECTROLYTE

FIELD OF THE INVENTION

The present invention relates to a solid electrolyte and, in particular, to a solid electrolyte suitable as a material for use in batteries and other electrochemical devices.

BACKGROUND OF THE INVENTION

Solid electrolytes for use in batteries and other electrochemical devices must have good ionic conductivity in addition to excellent film forming properties and good storage stability. Moreover, the solid electrolyte must be simple to produce. However, solid electrolytes which satisfy all of these requirements have not yet been developed.

For example, it is known that inorganic solid electrolytes such as Na-$\beta$-Al$_2$O$_3$ and Na$_{1+x}$Zr$_2$P$_{3-x}$Si$_x$O$_{13}$ (wherein x is from 0 to 3) have good ionic conductivity as described in M. S. Whittingham et al. *Journal of Chemical Physics*, 54, 414 (1971) and A. Clearfield et al, *Solid State Ionics*, 9/10, 895 (1983). However, these inorganic solid electrolytes have very low mechanical strength and are difficult to process into a flexible film.

Further it is known that complexes of polyethylene oxide and various salts of metals belonging to Group I or Group II of the Periodic Table (such as LiCF$_3$SO$_3$, LiI, LiClO$_4$, NaI, NaCF$_3$SO$_3$, and KCF$_3$SO$_3$) function as solid electrolytes (see P. Vashista et al, *Fast Ion Transport in Solid*, 131 (1979)). These complexes have good pliability and viscoelasticity, both of which are inherent to polymeric materials, and are easy to process. However, since the ionic conductivity of polyethylene oxide is highly dependent on temperature, and although exhibiting good ionic conductivity at 80° C. or higher, the ionic conductivity abruptly decreases at room temperature or lower. Thus it is difficult to use polyethylene oxide in general purpose commercial products for use over a wide temperature range.

In order to overcome the abrupt decrease in ionic conductivity at room temperature or lower, as seen in such polyethylene oxide-based solid electrolytes, Japanese Pat. application No. 62-139266 proposes a method wherein a mixture of polyethylene oxide having a conventional molecular weight and low molecular weight polyethylene oxide having a molecular weight of not higher than 1,000 is used. However, this proposal does not provide a good means for solving the problems of the prior art, i.e., use of a large proportion of low molecular weight polyethylene oxide provides improved ionic conductivity at room temperature but the film forming properties are greatly impaired thus leading to difficulty in film formation.

A method for imparting good film forming properties while retaining good ionic conductivity at room temperature by chemically modifying the low molecular weight polyethylene oxide, and a method for introducing low molecular weight polyethylene oxide into the side chains of a vinyl based polymer is reported by D. J. Bannister et al, *Polymer*, 25, 1600 (1984). Although such a polymeric material forms a solid electrolyte in combination with LiClO$_4$ and has good film forming properties ionic conductivity at room temperature is not yet satisfactory.

Moreover polymeric materials comprising a combination of low molecular weight polyethylene oxide and a silicone compound ar reported by Nagaoka et al. *Journal of Polymer Science*, Polymer Letter Edition 22, 752 (1982), D. J. Bannister et al, *Polymer Communications*, 27, 648 (1988). Although these polymeric materials form a solid electrolyte in combination with, e.g., LiClO$_4$ or LiCF$_3$SO$_3$, have good film forming properties, and have good ionic conductivity at room temperature, these materials have poor storage stability in that the polymer chain is gradually severed, thus leading to a reduction in molecular weight.

Moreover, materials wherein low molecular weight polyethylene oxide is introduced into a silicone are reported by Watanabe et al, *Journal of Power Source*, 20, 327 (1987). However, since the rate of introduction of the low molecular weight polyethylene oxide is low, such materials cannot be satisfactorily used unless a proportionately large quantity of a polymeric material is used.

Watanabe et al discloses an ionic conductor of 10$^{-6}$ Scm$^{-1}$ at room temperature obtained from a network polymer of following components (A) and (B) and LiClO$_4$ Additionally, polyphosphazene having low molecular weight polyethylene oxide in the side chains thereof is reported by D. F. Shriver et al., *Journal of American Chemical Society*, 106, 6854 (9184). Although a solid electrolyte comprising a combination of such a polymer with, e.g., LiClO$_4$, exhibits good ionic conductivity at room temperature and has good film forming properties and adequate storage stability, polyphosphazene having low molecular weight polyethylene oxide in the side chains thereof has proved to be unsuitable for industrial production. The subject material is synthesized by derivation of hexachlorophosphazene into polydichlorophosphazene upon a ring opening polymerization and a subsequent reaction with a sodium salt of a low molecular weight polyethylene oxide. A first problem encountered in the production thereof resides in the polymerization reaction which converts hexachlorophosphazene to polydichlorophosphazene. As the polymerization reaction proceeds, a competing crosslinking reaction also takes place. The reactant becomes insoluble in the reaction solvent such that polymerization does not proceed satisfactorily. Accordingly, polydichlorophosphazene cannot be obtained from hexachlorophosphazene in good yield, which results in high production costs.

A second problem encountered in the production thereof resides in the reaction step between polydichlorophosphazene and the sodium salt of the low molecular weight polyethylene oxide. In general, reaction with a polymer having a functional group proceeds at a much lower reaction rate as compared to reaction with a low molecular weight compound having the same functional group. In order for the reaction to proceed satisfactorily, it is necessary to add a large excess of reactants (in the instant case, the sodium salt of low molecular weight polyethylene oxide). This results in a mixture of polyphosphazene having low molecular weight polyethylene oxide in the side chains thereof with low molecular weight polyethylene oxide, whereby the film forming properties of the derived solid electrolyte are deteriorated (as seen in Japanese Pat. application 62-139266). In order to decrease the amount of low molecular weight polyethylene oxide incorporated, the amount of the sodium salt of low molecular weight polyethylene oxide reacted with the polydichlorophosphazene may be decreased. However, as the amount of low molecular weight polyethylene oxide decreases, the rate of introduction of polyethylene oxide into the side chains of the polyphsphazene is greatly reduced. Thus, in order to attain the desired ionic conductivity, a large quantity of polymeric material must be used.

In the light of the above, the hitherto developed solid electrolytes are not capable of collectively satisfying all the necessary properties for application to batteries or other electrochemical devices.

SUMMARY OF THE INVENTION

A first object of the present invention is to provide a novel solid electrolyte which exhibits high ionic conductivity at room temperature, most preferably higher than $10^{-6}$ ($\Omega^{-1}cm^{-1}$).

A second object of the present invention is to provide a novel solid electrolyte which has excellent film forming properties.

A third object of the present invention is to provide a novel solid electrolyte having good ionic conductivity, excellent film forming properties (i.e., the resulting film is flexible and has high mechanical strength), excellent storage stability, and which is readily manufactured.

A fourth object of the present invention is to provide a novel polymer electrolyte which can be used as an effective replacement for prior art polymer electrolytes in any conventional lithium battery.

In order to overcome the above-described problems of the prior art, the present inventors have found that the foregoing objects of the present invention are attained by a solid electrolyte comprising a polymer containing therein at least 50 mol% of a recurring unit represented by the following general formula (I):

wherein $L_1$ and $L_2$ are each a divalent connecting group; $R_1$ and $R_2$ and $R_2$ are each hydrogen, an alkyl group, or an aryl group; m and p are each an integer of from 1 to 10; $X_1$ and $X_2$ are each —O— or —S—; n is an integer of from 10 to 100; a and b are each integers of from 0 to 10; and c is 0 or 1, provided that when c is 0, then a or b is at least 1, and a salt of a metal ion belonging to the Group I or Group II of the Periodic Table.

DESCRIPTION OF THE PREFERRED EMBODIMENTS

In general formula (I), $L_1$ and $L_2$ may be the same or different. As the divalent connecting group represented by $L_1$ and $L_2$, an alkylene group, an aralkylene group, and an oxyalkylene group are exemplified, and these groups may be substituted. It is contemplated that aralkylene groups with 7 to 20 carbon atoms and oxyalkylene groups with 6 to 20 carbon atoms should be useful.

Examples of the substituents include a hydroxyl group, an alkoxy group, an alkyl group, a fluorine atom, a chlorine atom, and a bromine atom. There should be no limit on the number of substituents, i.e., they should be capable of substitution on every carbon atom. Usually no substituents are used.

It is most preferred that $L_1$ and $L_2$ be an alkylene group having 3 to 5 carbon atoms. The most preferred substituents for $L_1$ and $L_2$ are $C_1$ to $C_3$ alkyl groups. Preferred and typical examples of the divalent connecting group represented by $L_1$ and $L_2$ are propylene, and phenethylene, with propylene being most preferred. It is contemplated that alkoxy groups with 1 to 3 carbon atoms will be useful as substituents.

$X_1$ and $X_2$ are each —O— or —S—.

n is the polymerization degree and is an integer of from 10 to 100.

$R_1$ and $R_2$ are each a hydrogen atom, an alkyl group, or an aryl group, preferably an alkyl group containing from 1 to 10 carbon atoms, more preferably an alkyl group containing from 1 to 3 carbon atoms, even more preferably an alkyl group having from 1 to 2 carbon atoms and most preferably a methyl group. It is contemplated that aryl groups with 6 to 20 carbon atoms will be useful. m and n are each an integer of from 1 to 10 and preferably from 3 to 7. a and b are each independently integers from 0 to 10. c is 0 or 1, provided that when c is 0, then a or b is at least 1. a and b are preferably 0 or 1. Preferably, c is 1.

The recurring unit represented by general formula (I) is present in an amount of at least 50 mol%, preferably at least 80 mol%, and more preferably 100 mol%, in the polymer.

The remaining maximum 50 mol% in the polymer is a component for improving the film forming properties and includes materials such as the polyethylene oxides, polypropylene oxides and silicones in general such as the dialkyl polysiloxanes, e.g., dimethylpolysiloxane, diethylpolysiloxane, dipropylpolysiloxane, etc., where alkyl groups in the alkyl moiety with 1 to 6 carbon atoms are contemplated as most useful. The copolymers are random copolymers. The molecular weight of the component for improving film properties is not contemplated as important and commercially available materials can be used.

The polymers of the present invention include homopolymers and copolymers, i.e., the polymers may have one or more components shown by formula (I) or may have, e.g., a dialkylsiloxane as a second component. The polymers are, however, preferably homopolymers.

Typical examples of the polymer containing therein a recurring unit represented by the general formula (I) are given below but, as a matter of course, the present invention is not considered to be limited thereto. In the following examples, n is the polymerization degree; the polymerization degree being from 10 to 100. The terminals connected to the $+Si-O+_n$ moiety in the following polymers were hydrogen (bonded to the oxygen) and hydroxyl (bonded to the silicone).

P-1: Si 3"O"

$$+Si-O+_n$$
with substituents $CH_2CH_2CH_2(OCH_2CH_2)_2OCH_3$ (both positions)

P-2: Si 4"O"

$+Si-O+_n$ with substituents $CH_2CH_2CH_2(OCH_2CH_2)_3OCH_3$ (both positions)

P-3: Si 8"O"

$+Si-O+_n$ with substituents $CH_2CH_2CH_2(OCH_2CH_2)_7OCH_3$ (both positions)

P-4: Si—OOS $+Si-O+_n$ with substituents $CH_2CH_2CH_2(OCH_2CH_2)_2SCH_3$ (both positions)

P-5: Si—SOO $+Si-O+_n$ with substituents $CH_2CH_2CH_2S(CH_2CH_2O)_2CH_3$ (both positions)

P-6: Si—N 8"O"

$+Si-O+_n$ with substituents $CH_2CH_2CH_2NH(CH_2CH_2O)_8CH_3$ and $CH_3$

P-7: Si—N 3"O"

$+Si-O+_n$ with substituents $CH_2CH_2CH_2NH(CH_2CH_2O)_3CH_3$ and $CH_3$

P-8: Si—N SOO $+Si-O+_n$ with substituents $CH_2CH_2CH_2NHCH_2CH_2S(CH_2CH_2O)_2CH_3$ and $CH_3$ P-9: Si—S 2"O"

$+Si-O+_n$ with substituents $CH_2CH_2CH_2S+CH_2CH_2O+_2CH_3$ and $CH_3$

P-10: Si—S 3"O"

$+Si-O+_n$ with substituents $CH_2CH_2CH_2S+CH_2CH_2O+_3CH_3$ and $CH_3$

P-11: Si—S 4"O"

$+Si-O+_n$ with substituents $CH_2CH_2CH_2S+CH_2CH_2O+_4CH_3$ and $CH_3$

P-12: Si—S 5"O"

$+Si-O+_n$ with substituents $CH_2CH_2CH_2S+CH_2CH_2O+_5CH_3$ and $CH_3$

P-13: Si—S 6"O"

$+Si-O+_n$ with substituents $CH_2CH_2CH_2S+CH_2CH_2O+_6CH_3$ and $CH_3$

Figure 2:
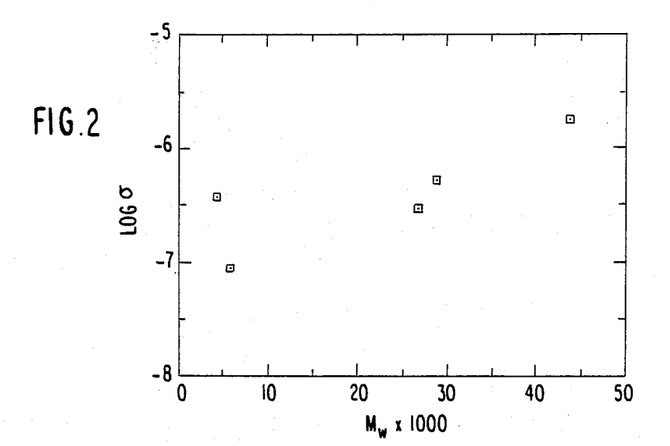
FIG. 2 shows the effect of molecular weight on conductivity at 25° C. for the polymer Si 3"O" of the present invention.

We believe the polymers containing therein a recurring unit represented by the general formula (I) should advisably have a weight average molecular weight ($\overline{M}w$) (calculated as polystyrene) of from about 1,000 to about 100,000, preferably from 2,000 to 50,000 and more preferably from 4,000 to 20,000 by a conventional GPC analysis. If the $\overline{M}w$ is too low, the film forming properties deteriorate, whereas if the $\overline{M}w$ is too high, ionic conductivity decreases. FIG. 2 shows the general trend of increasing conductivity with increasing molecular weight.

Preferred examples of the metal ion belonging to Group I or Group II of the Periodic Table are lithium, sodium, and potassium ions. Typical examples of the metal salt include $LiCF_3SO_3$, $LiClO_4$, $LiI$, $LiBF_4$, $LiCF_3O_2$, $LiSCN$, $NACF_3SO_3$, $NaI$, $NaClO_4$, $NaBF_4$, $KCF_3SO_3$, $KSCN$, and $KClO_4$. Among them, the lithium salts are preferred.

With respect to the ratio of the polymer containing therein a recurring unit represented by general formula (I) to the metal ion salt, it is preferred that the polyethylene oxide unit be present in a molar ratio of from 1 to 10 times, more preferably from 6 to 9 times, the metal ion. We believe that if the ratio of polyethylene oxide to metal ion salt is more than about 20, the polymer obtained tends to become harder, Tg (glass transition point) is increased and ionic conductivity is lower. On the other hand, if this ratio is less than 1, ionic conductivity is lowered and film forming properties are reduced.

Examples of solvents for use in preparing the solid electrolyte include nitriles (e.g., acetonitrile and benzonitrile), ketones (e.g., acetone and methyl ethyl ketone), carbonates (e.g., propylene carbonate and ethylene carbonate), ethers (e.g., tetrahydrofuran, 3-methyltetrahydrofuran, 1,3-dioxane, 1,4-dihydroxyfuran, and 1,2-dimethoxyethane), lactones (e.g., γ-butyrolactone and δ-butyrolactone, dimethyl sulfoxide, tetramethylenesulfone, and dimethylformamide. The solvent is not limited thereto. These solvents can be used either singly or in admixture of two or more thereof.

It is convenient to use about 1 to about 40% polymer plus the salt of the metal ion in the solvent (wt/vol), and about 10%, i.e., 10 gm polymer plus the salt of the metal ion in 100 ml of solvent is most convenient. The amount of solvent is not overly important. More solvent will, of course, yield a thinner film of the solid electrolyte.

Typical synthesis examples of the polymer containing therein a recurring unit represented by the general formula (I) according to the present invention are given below.

SYNTHESIS EXAMPLE 1

Synthesis of Si-S 2"O" Polymer P-9

(a) Intermediate 12A: $ClCH_2CH_2OCH_2CH_2OCH_3$

The chloride, Intermediate 12A, was prepared by treating $HOCH_2CH_2OCH_2CH_2OCH_3$ (the glycol) with $P(C_6H_5)_3/CCl_4$. The use of $P(C_6H_5)_3/CCl_4$ reagent to convert alcohols to alkyl chlorides is well established as described by I. M. Downie, J. B. Holmes and J. B. Lee *Chemistry and Industry* (London), 900 (1966).

$CCL_4$ (23.8 g) and 18.5 g of the glycol were mixed in a 250-ml flask, and then 40.0 g of triphenylphosphine was added. The reaction mixture was heated for 4 hours at about 70° C. It was then cooled and diluted by adding it to 500 ml of hexane in a 1-L flask. The resulting solid, $(C_6H_5)_3PO$, was removed by filtration. The filtrate was concentrated in a rotary evaporator to give the Intermediate 12A.

(b) Si-S 2"O" Polymer P-9

In a 250-mL round-bottom flask were mixed 15.0 g of Intermediate 12A $ClCH_2CH_2OCH_2CH_2OCH_3$, 26.19 g of 25% $(CH_3)_4NOH$, and 8.92 g of poly(mercaptopropylmethyl)siloxane. The reaction mixture became translucent. After the mixture stood at room temperature for 1 hour, two layers had formed. After the contents were refluxed for 6 hours at 100° C., two layers formed again. The bottom layer in the reaction flask was mixed with 200 ml of water and dialyzed for 3 days. The contents of the dialysis capsule were transferred to a 500-ml flask and the capsule was washed with methanol. The methanol washings were added to the flask and the contents were concentrated to give P-9 in 51% yield.

SYNTHESIS EXAMPLE 2

Synthesis of Si 3"O" Polymer P-3

(a) Intermediate 1C: Polyethyleneglycol methyl allyl ether

Polyethyleneglycol monomethyl ether (35 g, 0.1 mol) was added to a cooled ether solution (100 mL) containing potassium t-butoxide (11.1 g, 0.1 mol) and stirred at room temperature for 30 minutes. Allyl bromide (12.1 g, 0.1 mol) was added slowly to the ether solution. The reaction mixture was then stirred for 16 hours at room temperature. The solution was filtered to remove the white precipitate. The filtrate was concentrated and fractionally distilled to give pure polyethylene glycol methyl allyl ether in a 90% yield.

(b) Intermediate 2C: $(ROCH_2CH_2CH_2)_2SiCl_2 R=CH_2CH_2(OCH_2CH_2)_6OCH_3$

Dichlorosilane (3 ml) was transferred to a high pressure reactor containing chloroplatinic acid (100 mg) and Intermediate 1 C (10 g). The reaction mixture was stirred at 50° C. for 2 hours. The excess dichlorosilane was vented. No Si-H and $CH_2=CH$ peaks were detected in the product by IR and NMR spectroscopy.

(c) Si 8"O" Polymer P-3

Intermediate 2C (1 ml) was refluxed in 20% HCl:ethanol (1:1. v/v, 1 ml) for 2 hours. The solvent was then removed to yield the polymer P-3 with a molecular weight of 6250 as determined by GPC.

SYNTHESIS EXAMPLE 3

Snythesis of Si-N 8"O" Polymer P-6

(a) Intermediate 4:

Poly(3-aminopropyl-methylsiloxane)

This polymer was prepared by adding 3-aminopropyl methyl diethoxysilane in ether to a stirred solution of $NH_4OH-H_2O$ (1:4, v/v) and reacted at room temperature for 2 hours. Because the polymer was not completely soluble in tetrahydrofuran (THF), the molecular weight was not determined.

(b) Si-N 8"O" Polymer P-6

To a stirred aqueous solution (4 mL), of Compound 4 (10 mmol), KOH (11 mmol) and $Cl(CH_2CH_2O)_8CH_3$ were added. The resulting mixture was reacted at 80° C. for 4 hours. After the reaction, two layers were formed, the top layer was collected, washed with water, dried, and concentrated to dryness to give the polymer P-6.

SYNTHESIS EXAMPLE 4

Synthesis of Si-OOS Polymer P-4

(a) Intermediate 7: Allyl 2-(2-chloroethoxyl)ethyl ether

To a chloroethoxyethanol (0.15 mol) solution in ether (250 ml) cooled to 0° C., potassium t-butoxide (0.15 mol) was added. The solution was stirred for 1 hour and cooled to 0° C. again. Allyl bromide (0.15 mol) was added in portions to the cooled reaction solution, and the mixture was stirred overnight at room temperature. The precipitate was filtered off, and the filtrate was concentrated and fractionally distilled The fraction at 58-60° C. was collected in 24% yield.

(b) Intermediate 8: Dichlorodialkylsilane

Intermediate 7 (0.46 mol), chloroplatinic acid (30 mg), and an excess of dichlorosilane were reacted in a high pressure reactor at 80° C. After 2 hours, the excess dichlorosilane was vented. The structure of the product was identified by NMR and IR spectroscopy.

(c) Intermediate 9: Polysiloxane

Intermediate 8 in ether was added to a stirred solution of $NH_4OH-H_2O$ (1:4, v/v) and stirred for 2 hours at room temperature to give a liquid polymer. GPC showed the molecular weight of the polymer to be 5500.

(d) Si-OOS Polymer P-4

An excess of methylthiol was dissolved in 20% tetramethyl-ammonium hydroxide methanolic solution (2.5 g) and stirred for 20 minutes at room temperature. Intermediate 9 (1 g) was added, and the resulting solution was then refluxed for 4 hours. The methanol was evaporated, and the residue was washed with water and dried to give the product. The $M_w$ was determined by GPC to be 12,800.

EXAMPLE 1

(1) Preparation of Solid Polymer Electrolyte (a) Materials

All procedures for handling the cell materials were conducted in a nitrogen dry box. Batteries containing Li metal were assembled in an argon dry box to prevent any reaction of lithium with nitrogen to form lithium nitride.

Tetrahydrofuran (THF) was distilled from Na/benzophenone under nitrogen before use. Lithium trifluoromethanesulfonate ($LiCF_3SO_3$; Li Triflate or LiTF) obtained from Aldrich Chemical Co. was used as received. Lithium ribbon (0.38 mm thick×50 mm wide) was obtained from AESAR and stored under argon. Ammonium vanadate (Aldrich Chemical Co., 99.99%) was used without further purification. Shawinigan black (50% compressed) was obtained from Chevron Chemical Co. Polyethylene oxide (PEO, $M_w$ 100,000) was obtained from Aldrich Chemical Co. and dried at 140° C. before use.

Preparation of Polymer/Lithium Complexes

Solutions of polymer/Li triflate complexes were prepared by dissolving a known quantity of $LiCF_3SO_3$ and polymer in dry (THF) solvent. The weights used were such that the molar ratio of oxygen atoms plus sulfur atoms to lithium atoms was 8. (The oxygen atoms in the backbone of the polymer are not used in the calculation.) For example, 31.9 mg of $LiCF_3SO_3$ was used to 100 mg of Si 3"O" polymer. The oxygen atom in the backbone of the polymer was not counted. The mixture was then allowed to stand overnight.

For conductivity measurements, the polymer/Li complex solution was added dropwise into a Delrin cup to cast a film. The film was then dried for 3 days in a glass vacuum apparatus at 120° C. at <0.01 torr. Film thickness was measured using a micrometer.

For the battery tests, the solvent from the polymer/Li complex solution was allowed to evaporate in the dry box. The complex was then transferred to the Delrin cup and vacuum dried as described above. The resulting product is a blend of the solid polymer and the Li complex upon drying at room temperature.

(c) Equipment and Measurement Technique

Conductivities of the polymer electrolytes were evaluated by AC impedance spectroscopy. A film of the dried polymer electrolyte was sandwiched between two stainless steel blocking electrodes that each had an area of 0.7854 $cm^2$. Such stainless steel electrodes are for testing; they would not be used in a commercial battery The thickness of the polymer film typically which varied between 0.51 mm and 1.02 mm was measured with a micrometer. The assembly composed of the blocking electrode-polymer sandwich cell inside a Delrin cup (FIG. 3) was transferred to a vacuum chamber that had provision for heating and for applying a constant pressure of 65–97 lb/$in^2$ across the polymer film. The electrodes were connected to a potentiostat (PAR 173) operating in the galvanostatic mode.

We expect that thinner polymer films than above will provide better results in the sense of higher current densities, e.g., films of a thickness of down to 10 μm or below. The exact film thickness is largely a matter of design choice, of course.

Figure 3:
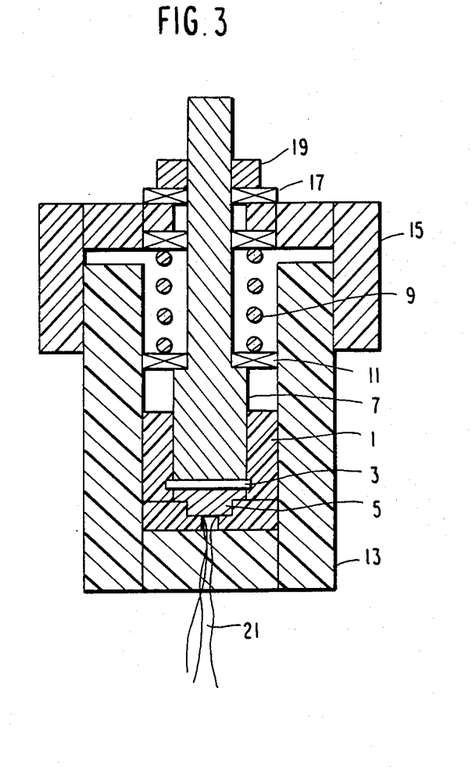
FIG. 3 is a diagram of the cell assembly for measuring electrolyte conductivities and for performing battery tests.

In FIG. 3, reference number (1) is the Delrin cup; (3) is the polymer electrolyte under evaluation; (5) is a stainless steel contact; (7) is a stainless steel plunger; (9) is a spring; (11) is a ball bearing; (13) is the lexan cell body; (15) is the lexan cup; (17) is a ball bearing; (19) is a steel nut; and (21) are electrical leads from the load cell.

The cell was then perturbed with a small AC signal generated by a Solartron 1250 Frequency Response Analyzer, and the real and imaginary components of the cell impedance were measured as a function of frequency at each of the desired temperatures. The setup was allowed to stabilize overnight after the temperature was changed. The AC impedance data were plotted in both the Nyquist and Bode planes to identify the high frequency relaxation arising due to the polymer electrolyte. Typically, the frequency of the AC signal was scanned from 65 KHz down to 10 mHz. The intercept at the real axis of the high frequency relaxation was assumed to represent the resistive component of the polymer electrolyte impedance. This was then converted to the resistivity of the polymer (the thickness and the area of the polymer film were known). The reciprocal of resistivity gave the conductivity, $\sigma$, having units of $\Omega^{-1} cm^{-1}$. In cases where high frequency relaxation occurred above 65 KHz, a Hewlett Packard 4192A Impedance Analyzer was used to measure the polymer electrolyte resistance. This instrument has a frequency range capability of 13 MHz to 5 Hz.

The battery performance tests utilized a PAR 173 potentiostat/galvanostat to produce constant current charge/discharge cycles between predetermined voltage levels.

(d) Preparation of $V_6O_{13}$ Cathodes

Vanadium oxide was prepared by thermally decomposing ammonium vanadate in argon $NH_4VO_3$ was placed in a quartz boat and flushed with argon. for 30 minutes. The temperature was then raised from room temperature to 500° C. at a rate of 4°/min., held at 550° C. for 1 hour and then slowly cooled to room temperature. The product obtained was dark blue in color.

The composition of the cathode was 80% $V_6O_{13}$, 5.5% Shawinigan black, and 14.5% polymer/LiTF complex by weight. It is preferred to use some of the polymer/salt of a metal ion to form the cathode. The reason for this is that the polymer salt of a metal ion permits easy transfer of the metal ions in the polymer electrolyte in and out of the cathode. We contemplate amounts thereof of about 5 to about 20% to be useful. In this particular instance, carbon black was used to increase the conductivity of the cathode and to provide a binder effect to the cathode. Other equivalent particulate materials known in the art for such an effect can be used, of course. It is preferred to use the maximum amount possible of the cathode material itself, e.g., $V_6O_{13}$.

The amounts of $V_6O_{13}$ and Shawinigan black required were weighed into a polycarbonate vial and ground for 5 minutes in a Wig-L-Bug grinder. The mixture was dried for 3 days at 140° C. and <0.1 torr in an Abderhalden drying apparatus. In a 3 mL vial, 100 mg of polymer/LiTF complex was mixed with 589.7 mg of $V_6O_{13}$/Shawinigan black in THF. The mixture was intermittently shaken and allowed to stand overnight before the solvent was evaporated off in the dry box. The cathode mixture (100 mg) was pressed at 10,000 lb for 3 minutes in a stainless steel die with an area of 1.69 cm$^2$.

(e) Battery Assembly

To further set the present invention, the present invention finds particular use with conventional lithium batteries which involve a lithium anode e.g., Li, LiAl, etc. The cathode may be freely selected from those conventional in the art, e.g., $TiS_2$, $MoS_2$, $V_6O_{13}$, $VCrS_2$, $MoS_3$, $V_2O_5$, $V_2O_5$-$P_2O_5$, etc.

$V_6O_{13}$ cathodes were cut to size with a 1-cm-diameter punch. The cathodes were attached to the stainless steel plate in the Delrin cup with conducting epoxy (Cho-Bond 584). The adhesive was cured at 120° C. for 1 hour. Approximately 100 mg of the polymer/LiTF complex was weighed into the cup to form a film, as described above. Lithium anodes were freshly prepared by cutting lithium ribbon with the same punch and sanding the surfaces with emery paper. The cup was then loaded into the cell assembly as shown in FIG. 3.

In commercial use, of course, a conventional Li-based anode and a cathode of choice would be used in a conventional casing which would contain the polymer electrolyte.

(2) Conductivity of Polymer Electrolytes

Figure 1:
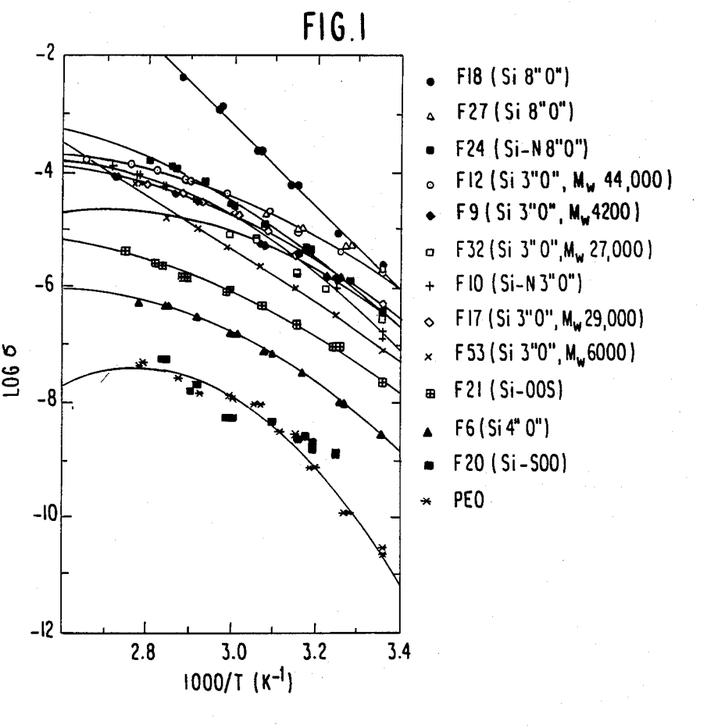
FIG. 1 is a plot of the logarithm of ionic conductivity as a function of the inverse absolute temperature for various solid polymer electrolytes of the present invention as compared to polyethylene oxide (PEO).

FIG. 1 shows the logarithm of conductivity ($\sigma$) variation for substituted polysiloxanes and PEO (polyethylene oxide) as a function of the inverse absolute temperature, and their conductivities at room temperature are summarized in Tables 1 and 2. FIG. 1 clearly indicates that Si 8"O" has the highest and PEO and Si-SOO the lowest conductivity values over the entire temperature range of 25° C. to 95° C. The rate of increase in conductivity with temperature is highest with Si 8"O". Table 2 shows that Si 8"O" and Si 3"O" have reasonably high conductivities at room temperature, with values in the range of $7.69 \times 10^{-8}$ to $2.21 \times 10^{-6} \Omega^{-1} cm^{-1}$. It is interesting to note that Si 3"O" shows a clear increase in conductivity with increasing molecular weight (FIG. 2). The highest room temperature conductivity with this polymer was obtained when the molecular weight reached 44,000. The battery performance experiments were conducted with a Si 3"O" polymer having a molecular weight of 27,000 and a conductivity of $2.69 \times 10^{-7} \Omega^{-1} cm^{-1}$ at room temperature. The polymer Si-S 2"O" exhibited the highest conductivity at room temperature, $1.65 \times 10^{-5} \Omega^{-1} cm^{-1}$ (Table 1). However, this polymer reacts with the lithium metal.

The conductivities obtained in this work for the PEO/LiCF$_3$SO$_3$ solid polymer electrolyte are considerably smaller than many reported in the literature. Contamination of the polymer with moisture after even a brief exposure to the laboratory atmosphere is sufficient to raise the conductivity by more than four orders of magnitude. In this instance, the high conductivity is due primarily to protons. However this is not a practical method for increasing the conductivity of an SPE (Solid Polymer Electrolyte) because contact with lithium metal in an operating battery results in hydrogen evolution and ultimate drying of the polymer. Nevertheless, care must be exercised in studying SPEs to ensure that water is rigorously excluded. The inventors have gone to great lengths in this work to ensure that the polymers are dry. This explains why the conductivities for PEO reported herein are much lower than many literature values.

From the data listed in Tables 1 and 2, it is apparent that the inventors have succeeded in developing an SPE with a conductivity of at least $10^{-6} \Omega^{-1} cm^{-1}$ at 25° C. Indeed, three polymers exceeding this target were synthesized including: Si-S 2"O" ($\sigma = 2.01 \times 10^{-6}$ to $1.65 \times 10^{-5} \Omega^{-1} cm^{-1}$), Si 3"O" ($\sigma = 7.69 \times 10^{-8}$ to $1.76 \times 10^{-6} \Omega^{-1} cm^{-1}$) and Si 8"O" ($\sigma = 7.21 \times 10^{-8}$ to $2.21 \times 10^{-6} \Omega^{-1} cm^{-1}$). The significance of this achievement is all the more apparent by noting that the conductivities for these SPEs at 25° C. are more than two orders of magnitude higher than the maximum conductivity for PEO at 80-90° C.

TABLE 1

CONDUCTIVITIES AT 25° C. WITH BLOCKING AND NONBLOCKING ELECTRODES

| Code Number | Polymer | Electrodes | Molar Ratio of O + S:Li | Conductivity $\sigma(\Omega^{-1}cm^{-1})$ | Log $\sigma$ | Drying Temperature °C. |
|---|---|---|---|---|---|---|
| F57 | Si—S 2"O" | SS/SS* | 8 | $2.26 \times 10^{-6}$ | −5.64 | 120 |
| F61 | Si—S 2"O" | Li/V$_6$O$_{13}$ | 8 | $2.01 \times 10^{-6}$ | −5.70 | 120 |
| F63 | Si—S 2"O" | SS/SS | 8 | $1.65 \times 10^{-5}$ | −4.78 | 80 |
| S4 | PEO | SS/SS | 8 | $2.51 \times 10^{-11}$ | −10.60 | 130 |

*SS: stainless steel.

TABLE 2

CONDUCTIVITIES AT 25° C. WITH BLOCKING AND NONBLOCKING ELECTRODES

| Code Number | Polymer | Electrodes | Molar Ratio of S + O:Li | Conductivity $(\Omega^{-1}cm^{-1})$ | Log $\sigma$ | Mw ($\times$ 1000) |
|---|---|---|---|---|---|---|
| F18 | Si 8"O" | SS/SS* | 8 | $2.11 \times 10^{-6}$ | −5.68 | 8 |
| F27 | Si 8"O" | SS/SS | 8 | $2.21 \times 10^{-6}$ | −5.66 | |
| F38 | Si 8"O" | Li/Li | 7 | $7.21 \times 10^{-8}$ | −7.1 | |
| F12 | Si 3"O" | SS/SS | 8 | $1.76 \times 10^{-6}$ | −5.75 | 44 |
| F17 | Si 3"O" | SS/SS | 8 | $5.13 \times 10^{-7}$ | −6.29 | 29 |
| F9 | Si 3"O" | SS/SS | 8 | $3.69 \times 10^{-7}$ | −6.43 | 4 |
| F32 | Si 3"O" | SS/SS | 8 | $2.69 \times 10^{-7}$ | −6.54 | 27 |
| F39 | Si 3"O" | Li/Li | 8 | $7.13 \times 10^{-7}$ | −6.15 | 27 |
| F52 | Si 3"O" | Li/V$_6$O$_{13}$ | 8 | $2.49 \times 10^{-7}$ | −6.60 | 27 |
| F53 | Si 3"O" | SS/SS | 8 | $7.69 \times 10^{-8}$ | −7.11 | 6 |
| S4 | PEO | SS/SS | 8 | $2.51 \times 10^{-11}$ | −10.60 | 100 |

*SS = stainless steel.

(3) Battery Performance Tests

Figure 4:
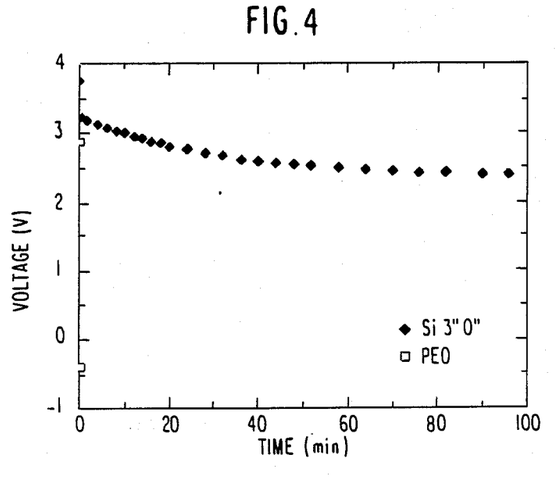
FIG. 4 compares the performance of the polymers PEO and Si 3"O" as polymer electrolytes in batteries with $V_6O_{13}$ cathodes at 25° C. and discharging at 5 μA.
Figure 5:
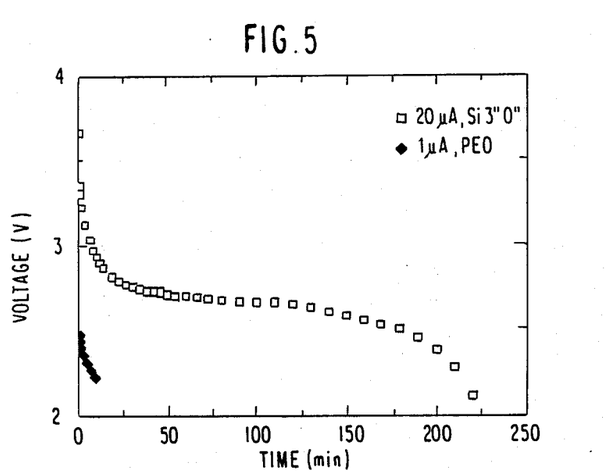
FIG. 5 compares the performance of the polymers PEO and Si 3"O" as polymer electrolytes in batteries with $V_6O_{13}$ cathodes at 45° C. The Si 3"O" polymer electrolyte is discharging at 20 μA. The PEO polymer electrolyte is discharging at 1 μA.

FIGS. 4 and 5 compare the performance of the polymers PEO and Si 3"O" as polymer electrolytes in batteries with $V_6O_{13}$ cathodes. FIG. 4 shows that at 25° C., the PEO battery is unable to retain any charge, while the Si 3"O" battery shows the ability to retain charge. The difference in performance is clearly demonstrated in FIG. 5: at 45° C. PEO is still unable to retain charge while Si 3"O" is able to sustain a discharge current of 20 μA for 188 minutes. FIGS. 4 and 5 clearly show the superiority of Si 3"O" over the widely used material PEO.

In continuous charge/discharge tests of a Li/Si 3"O"+LiTF/$V_6O_3$−(Mw=27,000)− to check long term performance, the voltage was cycled between 4.0 V and 1.8 V at 45° C. with a current density of 63.35 μA/Cm². The results obtained were very good. This is the most preferred system of the present invention.

EXAMPLE 2

Polymers Si 8"O" (P-3) and Si-OOS (P-4) were synthesized and evaluated in terms of molecular weight by means of gel permeation chromatography (GPC).

The measurement was carried out at a flow rate of 1 ml/min using poly(styrene-divinylbenzene) beads as the column material and tetrahydrofuran as an eluent.

To determine storage stability, each of the above polymers P-3 and P-4 were stored at 50° C. and 50% RH for 2 days and then evaluated by means of gel permeation chromatography under the same conditions. No substantial difference in molecular weight was observed.

In the light of the above, the polymer containing therein a recurring unit represented by the general formula (I) according to the present invention has good storage stability.

While the present invention has been described in detail and with reference to specific embodiments thereof, it will be apparent to one skilled in the art that various changes and modifications can be made therein without departing from the spirit and scope thereof.

What is claimed is:

1. A solid electrolyte comprising a polymer containing therein at least 50 mol% of a recurring unit represented by general formula (I):

wherein $L_1$ and $L_2$ are each a divalent linking group; $R_1$ and $R_2$ are each hydrogen, an alkyl group, or an aryl group; m and p are each an integer of from 1 to 10; $X_1$ and $X_2$ are each —O— or —S—; n is an integer of from 10 to 100; a and b are each integers of from 0 to 10; and c is 0 or 1, provided that when c is 0, then a or b is at least 1, and a salt of a metal ion belonging to Group I or Group II of the Periodic Table.

2. A solid electrolyte as in claim 1, wherein said divalent linking group represented by $L_1$ and $L_2$ is an alkylene group, an aralkylene group or an oxyalkylene group and $L_1$ and $L_2$ may be the same or different.

3. A solid electrolyte as in claim 1, wherein said divalent linking group represented by $L_1$ and $L_2$ is an alkylene group having from 3 to 5 carbon atoms.

4. A solid electrolyte as in claim 1, wherein $R_1$ and $R_2$ are each a methyl group.

5. A solid electrolyte as in claim 1, wherein said polymer contains at least 80 mol% of a recurring unit represented by general formula (I).

6. A solid electrolyte as in claim 1, wherein said polymer contains 100 mol% of a recurring unit represented by general formula (I).

7. A solid electrolyte as in claim 1, wherein said polymer further comprises a dialkylsiloxane unit in an amount of less than 50 mol%.

8. A solid electrolyte as in claim 1, wherein said polymer has a molecular weight of from 4,000 to 20,000.

9. A solid electrolyte as in claim 1, wherein said salt is $LiCF_3SO_3$.

10. A solid electrolyte as in claim 1, wherein the polyethylene oxide unit contained in the recurring unit represented by general formula (I) of the said polymer is present in a molar ratio of from 1 to 10 times the metal ion.

11. A battery comprising an anode, a cathode and a solid electrolyte comprising a polymer containing therein at least 50 mol% of a recurring unit represented by general formula (I):

wherein $L_1$ and $L_2$ are each a divalent linking group; $R_1$ and $R_2$ are each hydrogen, an alkyl group, or an aryl group; m and p are each an integer of from 1 to 10; $X_1$ and $X_2$ are each —O— or —S—; n is an integer of from 10 to 100; a and b are integers of from 0 to 10; and c is 0 or 1, provided that when c is 0, then a or b is at least 1, and a salt of a metal ion belonging to Group I or Group II of the Periodic Table.

* * * * *